United States Patent
Zhang

(10) Patent No.: US 7,251,492 B2
(45) Date of Patent: Jul. 31, 2007

(54) FREQUENCY REUSE SCHEME FOR DOWNLINK POWER CHANNELS IN A SECTORIZED NETWORK

(75) Inventor: Bulin Zhang, Branchburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 423 days.

(21) Appl. No.: 10/424,690

(22) Filed: Apr. 29, 2003

(65) Prior Publication Data

US 2004/0219942 A1    Nov. 4, 2004

(51) Int. Cl.
*H04Q 7/20* (2006.01)

(52) U.S. Cl. .................. 455/447; 455/522; 455/446

(58) Field of Classification Search ........ 455/446–449, 455/437, 440, 436, 441, 456, 444, 524, 525, 455/443, 429, 422.1, 561, 69, 522; 370/331, 370/332, 333
See application file for complete search history.

(56) References Cited

U.S. PATENT DOCUMENTS

| 4,128,740 A | * | 12/1978 | Graziano ..................... 455/447 |
| 4,144,496 A | * | 3/1979 | Cunningham et al. ...... 455/447 |
| 6,438,376 B1 | * | 8/2002 | Elliott et al. ................. 455/437 |
| 2002/0002063 A1 | * | 1/2002 | Miyamoto et al. .......... 455/560 |

FOREIGN PATENT DOCUMENTS

JP        09275584 A   * 10/1997

* cited by examiner

*Primary Examiner*—Edward F. Urban
*Assistant Examiner*—Tu X. Nguyen

(57) ABSTRACT

The frequency reuse scheme for downlink power channels in a sectorized network assigns transmit power for control channels transmitted by cell blocks in a cell layout such that cell blocks aligned in a particular direction have an incrementally higher transmit power.

22 Claims, 2 Drawing Sheets

FREQUENCY REUSE SCHEME FOR DOWNLINK POWER CHANNELS IN A SECTORIZED NETWORK

BACKGROUND OF THE INVENTION

Certain wireless communication systems such as time divisional multiple access (TDMA) and global system from mobiles (GSM) systems require base stations to transmit control channels at a constant and high power level so that these control channels are received by mobile stations even at the edge of a geographic area, referred to as a cell, served by the base station. When base stations are transmitting control channels at the same power as described above, the downlink carrier-to-interference ratio C/I of the control channels is determined by the reuse factor K. The reuse factor K determines the distance between two cells using the same frequency for transmission. As will be appreciated, downlink channel quality is better (e.g., C/I is higher) when the reuse factor K is larger. However, the utilization of available spectrum will be reduced with a larger reuse factor K. Stated another way, a smaller reuse factor K provides for a greater call handling capacity by making a greater number of frequencies available for use.

While a number of schemes have been proposed to improve the spectrum utilization for traffic channels, these schemes are not applicable for channels transmitted at constant power such as the above-mentioned control channels. Accordingly, the bottleneck for overall spectrum utilization becomes the reuse factor K for the control channels. This is especially true for GSM systems, where the percentage of spectrum used for control channels is quite high.

SUMMARY OF THE INVENTION

In the present invention, a cell layout includes cell blocks arrayed in a first direction and a second direction. Each cell block includes a plurality of cells, and each cell has a number of sectors. Each sector is designed to transmit one or more control channels at established frequencies.

According to one embodiment of the present invention, transmit power for control channels transmitted by the cell blocks is assigned such that the cell blocks in the second direction have incrementally higher transmit power.

According to another embodiment, the increment in transmit power is set such that the cell design provides at least a substantially equivalent carrier-to-interference ratio for the control channels as a second cell design based on the cell blocks having a larger number cells where a transmit power of control channels in cells of the cell blocks is substantially equal.

BRIEF DESCRIPTION OF THE DRAWINGS

The present invention will become more fully understood from the detailed description given below and the accompanying drawings, wherein like elements are represented by like reference numerals, which are given by way of illustration only and thus are not limiting on the present invention and wherein.

DETAILED DESCRIPTION OF EMBODIMENTS

Figure 1:
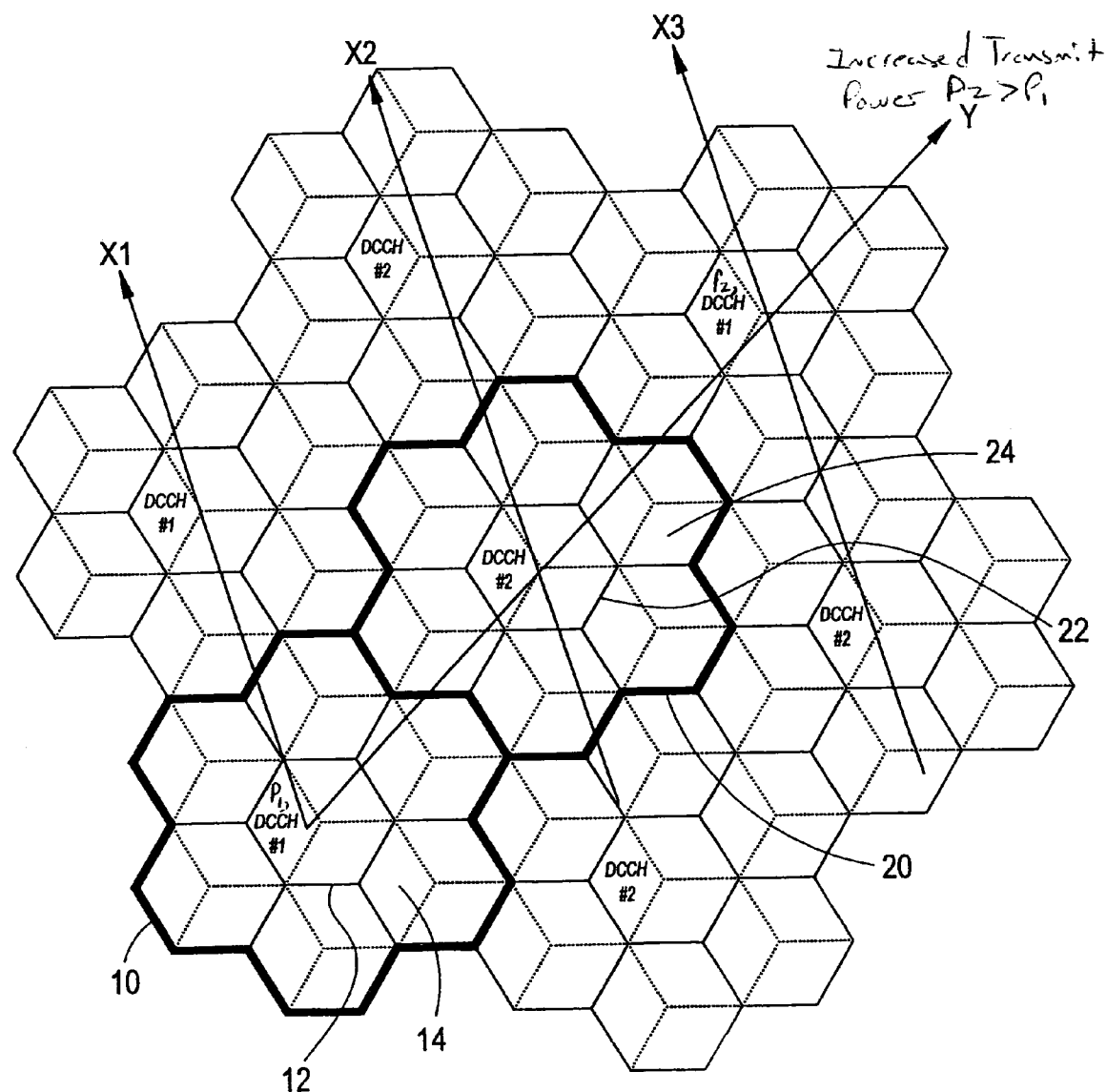
FIG. 1 illustrates a cell layout for a cell design created according to one embodiment of the frequency use scheme according to the present invention.

FIG. 1 illustrates a cell layout for a cell design created according to one embodiment of the frequency use scheme according to the present invention. As shown, cell blocks 10 are arrayed in a first X-direction X1. Each first cell block 10 includes seven cells 12, and each cell 12 is divided into three sectors 14. Typically a cell block is characterized by the number of cells and the number of sectors within the cell. Accordingly, first cell block 10 is characterized as a 7/21 cell block.

According to the cell design, frequencies are assigned to each sector for transmission of traffic channels, control channels, etc. The frequency assignments for a first cell block 10 are the same for each first cell block 10. Namely, the same sector in different first cell blocks 10 will utilize the same frequencies. For ease of illustration only, only one of the control channels for one of the sectors has been illustrated in each of the first cell blocks 10. Specifically, one of the downlink control channels DCCH #1 for a sector of the center cell 12 in each first cell block 10 has been illustrated. Also the power P1 for this sector, described in detail below, has been shown.

The cell design of FIG. 1 also includes a second array of second cell blocks 20 in a second X-direction X2, which is parallel to the first X-direction X1. As shown, the second X-direction X2 is adjacent to the array of first cell blocks 10 in the first direction X1. Each second cell block 20 has the same configuration as the first cell block 10. Namely, the second cell block 20 includes seven cells 22 each divided into three sectors 24.

As with the first cell blocks 10, frequencies for the traffic channels, control channels, etc., are assigned to each sector in the second control block 20. The same sector in different second control blocks 20 will utilize the same frequencies. This is illustrated in FIG. 1 by showing one of the control channels DCCH #2 used by a sector 24 of the center cell 22 within the second cell blocks 20. Also, the power P2 for this sector, described in detail below, has been shown. In the cell design of FIG. 1, the frequencies assigned to the second cell blocks 20 differ from the frequencies assigned to the first cell blocks 10, and this has been illustrated by showing that sector 24 in the center cell 22 of the second cell blocks 20 utilizes a control channel DCCH #2, which is different from the control channel DCCH #1 utilized by the corresponding sector 14 in the center cell 12 of the first cell blocks 10.

In the cell design of FIG. 1, arrays of first cell blocks 10 and second cell blocks 20 alternate in the array direction Y. This has been illustrated in FIG. 1 by showing another array of first cell blocks 10 arrayed in a third X-direction X3, which is parallel to the first and second X-directions X1 and X2. As shown, the array of first cell blocks 10 in the third X-direction X3 are adjacent to the array of second cell blocks 20 in the second X-direction X2. As further shown, the first cell blocks 10 in the third X-direction X3 have the same frequency assignments as the first cell blocks 10 in the first direction X1. Accordingly, 42 different channels are needed for a control channel in this alternate 7/21 reuse pattern (i.e., 21 different channels for the first cell block 10 and 21 different channels for the second cell block 20).

According to a prior art frequency reuse scheme for downlink control channels, the transmit power for control channels in the first cell blocks 10 arrayed in the first and third X-directions X1 and X3 are set to the same constant high power level.

The inventors have recognized that cell designs having a cell layout such as exemplified by FIG. 1 have no sector directly interfering with each other along the X direction. Instead, significant interference is from the sectors along the array direction Y. As a result, the inventors have recognized that the interference from co-channel sectors along the X direction is negligible, and the co-channel interference is dominated by sectors along the array direction Y. Also, the inventors have recognized that because of the way the sectors are aligned, the sectors in, for example, the third X-direction X3 will create interference with sectors along the first X-direction X1, but the sectors along the first X-direction X1 do not substantially interfere with sectors along the third X-direction X3. This statement holds true proceeding along the array direction Y for other arrays of first cell blocks 10 aligned in the X-direction. Furthermore, this statement holds true between second cell blocks 20 arrayed in the X-direction.

Based on an appreciation of the above recognized aspects of the cell layout, the inventors determined that the carrier-to-interference ratio C/I could be significantly improved by incrementally increasing the transmit power of the control channels along the array direction Y. For example, the transmit power (e.g., such as P2 shown in FIG. 1) of control channels in sectors 14 of first cell blocks 10 arrayed along the third X-direction X3 may be set at 2 dB higher than the transmit power (e.g., such as P1 shown in FIG. 1) of control channels in the sectors 14 in the first cell blocks 110 arrayed along the first X-direction X1. According to this example, the overall C/I of the control channels can be improved by 2 dB. As a result, the frequency reuse scheme according to the present invention allows for an improved C/I without changing the reuse factor.

While the present invention has been described as applied to an alternate 7/21 reuse configuration as shown in FIG. 1, application of the present invention is not limited to this cell layout. For example, the present invention may be applied to an alternate 4/12 reuse configuration. The present invention could also be applied to a non-alternating cell layout in which the same cell block, for example first cell block 10, is used in each array. Alternatively, the present invention is also applicable to a cell layout in which an array of one type of cell block, for example, first cell block 10, is not repeated for a number of arrays. Stated another way, a predetermined number of cell blocks aligned in the array direction Y will have different frequency assignments. The example shown in FIG. 1 illustrates the case where the predetermined number is 1. However, it will be appreciated that the predetermined number can be greater than 1.

While the present invention has been described as applied to an alternate 7/21 reuse configuration as shown in FIG. 1, application of the present invention is not limited to this cell layout. For example, the present invention may be applied to an alternate 4/21 reuse configuration. The present invention could also be applied to a non-alternating cell layout in which the same cell block, for example first cell block 10, is used in each array. Alternatively, the present invention is also applicable to a cell layout in which an array of one type of cell block, for example, first cell block 10, is not repeated for a number of arrays. Stated another way, a predetermined number of cell blocks aligned in the array direction Y will have different frequency assignments. The example shown in FIG. 1 illustrates the case where the predetermined number is 1. However, it will be appreciated that the predetermined number can be greater than 1.

Figure 2:
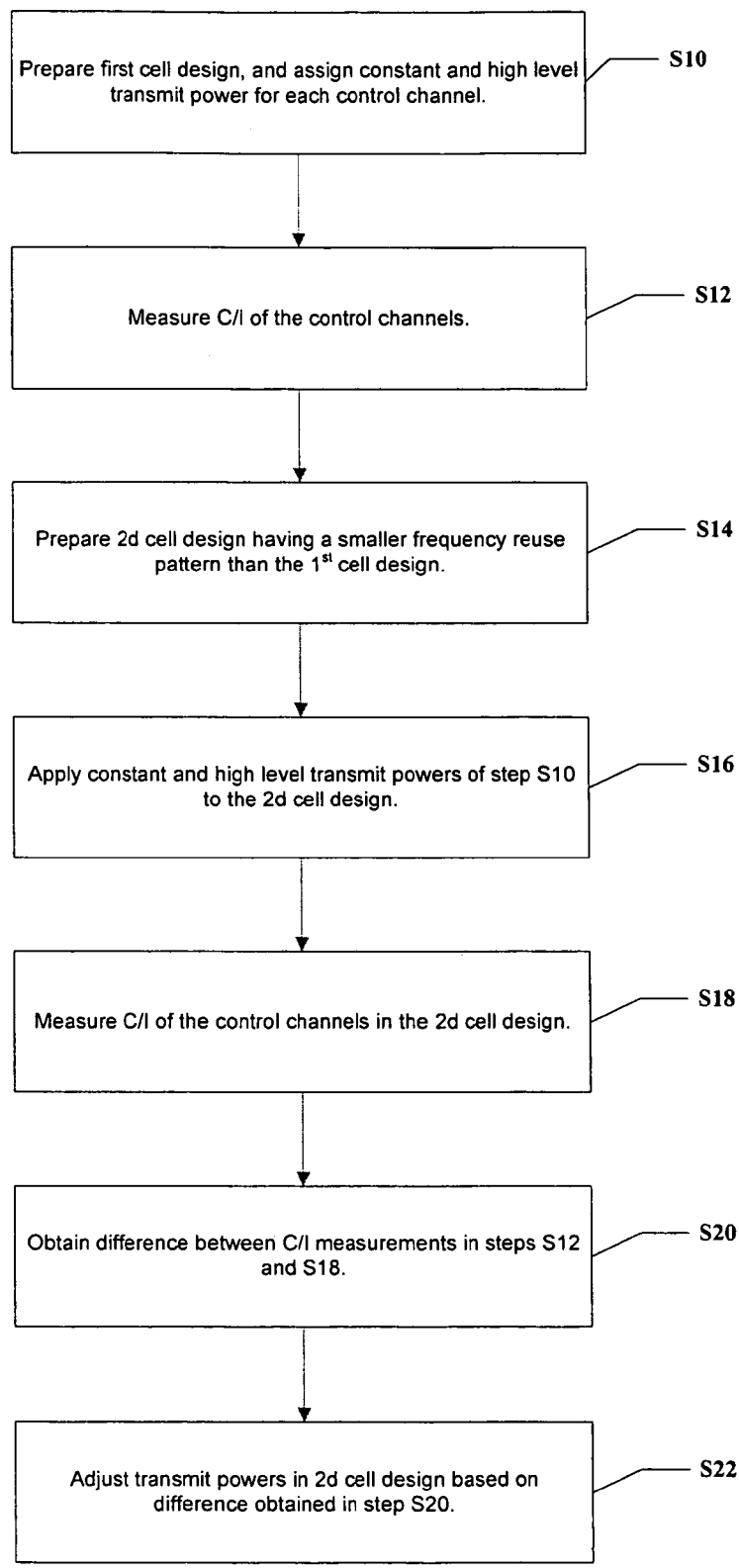
FIG. 2 illustrates a flow diagram of a method to establish transmit power in cells according to one embodiment of the present invention.

Next, an embodiment for reducing the reuse factor while maintaining the C/I performance through the application of the present invention will be described with reference to FIG. 2. According to this aspect of the invention, in Step S10 a cell design, such as illustrated in FIG. 1, is prepared and the prior art constant and high power level assignment of the transmit power for each control channel is performed. Next, in step S12, the C/I of the control channels is measured via a simulation in the conventional manner. For example, assume the cell layout of FIG. 1 with the transmit powers of the control channel set according to the prior art technique results in the C/I of the control channels being 23.6 dB. Next, a second cell layout design having a smaller frequency reuse pattern is prepared in step S14. For example, suppose a cell layout similar to FIG. 1 but having an alternate 4/12 reuse pattern is prepared. The prior art constant and high level method of setting the transmit powers of the control channels is then applied in step S16 to this smaller frequency reuse cell layout. Again, the C/I is measured through simulation in step S18. Assume, for the purposes of explanation, that the C/I of the alternate 4/12 reuse pattern is measured at 20.2 dB.

In step S20, the difference between the C/I of the control channels for the alternative 7/21 reuse pattern and the C/I of the alternate 4/12 reuse pattern is taken, which in the examples given above produces a 3.4 dB difference. The present invention is then applied in step S22 to the 4/12 reuse pattern with the incremental difference between the same cell blocks along the array direction being 3.4 dB.

As a result of applying the method of the present invention, the smaller reuse pattern, the alternate 4/12 reuse pattern, will have substantially the same C/I performance of the larger, alternate 7/21 reuse pattern. In addition, a substantial savings in the number of channels required by the cell layout will be achieved. Namely, as mentioned previously, the alternate 7/21 reuse pattern requires 42 channels. By contrast, the alternate 4/12 reuse pattern only requires 24 channels. The application of the present invention in this context results in a savings of 18 channels, which equals 0.54 MHz for an IS-136 (TDMA) system or a 3.5 MHz for a GSM system.

Other Considerations

One consideration for a frequency reuse scheme designed according to the present invention is how can the transmit power for control channels keep increasing for a large network. However, in practice, demand for channel capacity only occurs in major metropolitan areas. As a result, the present invention may only need to be applied to densely populated areas, such as a metropolitan area. It may not be necessary to apply the present invention to a more rural, less densely populated area. For a typical metropolitan network with 112 cells (336 sectors), the number of seven cell group blocks along one direction is about four. As a result, the increase in the transmit power along any specific direction would be a one step increase.

Furthermore, by proper alignment of the cell layout with respect to the geographic area to which the cell layout is being applied, other interference problems can be mitigated. For example, the cell layout is arranged in a geographical area such that sectors transmitting at the higher or highest powers direct their transmissions towards an unconcerned area. For example, in a coastal region, the cell layout could be arranged such that these high power sectors direct their transmissions toward the ocean.

It will further be appreciated, that the present invention can be combined with conventional frequency reuse and control channel transmit power schemes. For example, depending on the local geography, this scheme can be partially used for a specific direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

The invention claimed is:

1. A frequency reuse method for downlink power channels in a sectorized network, comprising:
assigning frequencies and transmit powers for control channels transmitted by the cell blocks in a cell layout, each cell block including more than one cell and each cell including more than one sector, the cell layout including sets of cell blocks, each set of cell blocks including cell blocks arrayed along a first direction, and the sets of cell blocks being arrayed parallel to one another along a second direction, the transmit powers for the control channels being assigned such that non-adjacent sets of the cell blocks along the second direction having same frequency assignments have incrementally higher transmit power.

2. The method of claim 1, wherein a cell block includes seven cells.

3. The method of claim 1, wherein a cell block includes four cells.

4. The method of claim 1, wherein the increment in transmit power between cell blocks in the second direction is set such that the cell layout provides an equivalent carrier-to-interference ratio for the control channels as a second cell layout based on cell blocks having a larger number of cells where a transmit power of control channels in cells of the cell blocks is equal.

5. The method of claim 1, further comprising:
applying the cell layout to a geographic area; and
adjusting the assigned transmit powers for the control channels based on field tests.

6. The method of claim 1, further comprising:
applying the cell layout to a geographic area.

7. The method of claim 6, wherein the applying applies the cell layout such that at least a portion of cell blocks transmitting at a highest assigned transmit power face an unconcerned area.

8. The method of claim 7, wherein the unconcerned area has a low population density.

9. The method of claim 6, wherein the geographic area is a metropolitan area.

10. The method of claim 1, wherein the assigning assigns same frequencies to non-adjacent sets of cell blocks along the second direction having a number of sets of cell blocks disposed there between.

11. The method of claim 10, wherein the number is one.

12. A method of designing a frequency reuse scheme for downlink power channels in a sectorized network, comprising:
preparing a first cell design, the first cell design including a cell layout based on an array of first cell blocks, each first cell block having a first number of cells, each cell in the first number of cells having a second number of sectors, the first cell design including control channel frequencies assigned to each sector of a cell in the first cell blocks and an assigned transmit power at which to transmit each control channel,
the assigned transmit power for control channels transmitted by the first cell blocks are such that the sectors in the cells of the first cell blocks transmit the control channels at a first same power; and
preparing a second cell design, the second cell design including a cell layout based on an array of second cell blocks, the second blocks being arrayed along a first and second direction, each second cell block includes a third number of cells, each cell in the third number of cells including a fourth number of sectors, the third number being less than the first number, and the second cell design including control channel frequencies assigned to each sector of a cell in the second cell blocks and an assigned transmit power at which to transmit each control channel,
the assigned transmit power for control channels transmitted by the second cell blocks are such that the sectors in the cells of the second cell blocks transmit the control channels at a second same power;
determining a difference in carrier-to-interference ratio for the control channels between the first cell design and the second cell design; and
adjusting, based on the determined difference, the assigned transmit power for control channels transmitted by the second cell blocks such that non-adjacent cell blocks along the second direction having a same frequency assignment have an incrementally higher transmit power.

13. The method of claim 12, wherein the first number is seven and the second number is four.

14. The method of claim 12, wherein the increment in transmit power between second cell blocks in the second direction is set such that the second cell design provides at an equivalent carrier-to-interference ratio for the control channels as the first cell design.

15. The method of claim 12, further comprising:
applying the second cell design to a geographic area; and
adjusting the assigned transmit powers for the control channels in the second cell design based on field tests.

16. The method of claim 12, further comprising:
applying the second cell design to a geographic area.

17. The method of claim 16, wherein the applying applies the second cell design such that at least a portion of second cell blocks transmitting at a highest assigned transmit power face an unconcerned area.

18. The method of claim 17, wherein the unconcerned area has a low population density.

19. The method of claim 16, wherein the geographic area is a metropolitan area.

20. The method of claim 12, wherein the increment in transmit power between second cell blocks in the second direction is equal to the determined difference.

21. The method of claim 12, wherein
the control channel frequencies assigned to sectors of cells in the second cell blocks forming a first set of second cell blocks along the first direction are same as in a non-adjacent second set of second cell blocks along the first direction, the second set of cell blocks being parallel to the first set of cell blocks and being separated from the first set of second cell blocks in the second direction by having a fifth number of sets of second cell blocks disposed there between; and
the adjusting adjust the assigned transmit power for control channels transmitted by the second set of second cell blocks such that the second set of second cell blocks have an incrementally higher transmit power than the first set of second cell blocks.

22. The method of claim 21, wherein the fifth number is one.

* * * * *